United States Patent [19]
Andrepont, Jr. et al.

[11] Patent Number: 5,427,079
[45] Date of Patent: Jun. 27, 1995

[54] SUPERCHARGED ENGINE WITH VARIABLE RATIO DRIVE SUPERCHARGER

[75] Inventors: Paul E. Andrepont, Jr., Grosse Pointe Farms; Dennis W. Rhee, Bloomfield Hills; John H. Taylor, Farmington Hills, all of Mich.

[73] Assignee: Ford Motor Company, Dearborn, Mich.

[21] Appl. No.: 156,113

[22] Filed: Nov. 22, 1993

Related U.S. Application Data

[63] Continuation-in-part of Ser. No. 985,725, Dec. 4, 1992, abandoned.

[51] Int. Cl.⁶ .................................................. F02B 33/00
[52] U.S. Cl. .................................... 123/561; 123/564; 60/290
[58] Field of Search .................... 60/280, 290; 123/561, 123/564

[56] References Cited

U.S. PATENT DOCUMENTS

| | | | |
|---|---|---|---|
| 2,583,882 | 1/1948 | Ricardo | 123/119 |
| 3,393,668 | 8/1966 | Milgram | 123/119 |
| 4,083,183 | 4/1978 | Yaegashi et al. | 60/290 |
| 4,162,612 | 7/1979 | Mitsuda et al. | 60/276 |
| 4,245,472 | 1/1981 | Miura | 60/290 |
| 4,350,135 | 9/1982 | Casey et al. | 123/564 |
| 4,488,400 | 12/1984 | Eddy | 60/274 |
| 4,530,339 | 7/1985 | Oguma et al. | 123/561 |
| 4,702,219 | 10/1987 | Tadokoro et al. | 60/290 |
| 5,022,375 | 6/1991 | Goto et al. | 123/564 |
| 5,105,620 | 4/1992 | Matsumura | 60/290 |
| 5,117,799 | 6/1992 | Suzuki et al. | 123/561 |

FOREIGN PATENT DOCUMENTS

| | | |
|---|---|---|
| 0012012 | 2/1981 | Japan. |
| 0105520 | 7/1982 | Japan. |

*Primary Examiner*—Richard A. Bertsch
*Assistant Examiner*—Charles G. Freay
*Attorney, Agent, or Firm*—Roger L. May; Allan J. Lippa

[57] ABSTRACT

A supercharger system for an internal combustion engine in a vehicle driveline that includes a catalytic converter for oxidizing undesirable exhaust gas emissions including a single, dual-purpose air pump for establishing combustion airflow for the engine as well as for the catalytic converter including an automatic control valve system having an electronic microprocessor that monitors varying engine operating conditions for establishing optimum airflow for fuel combustion purposes and for oxidizing exhaust gas emissions throughout a range of operating conditions for the engine, the system including a variable ratio mechanical drive between the engine and the air pump.

9 Claims, 8 Drawing Sheets

5,427,079

SUPERCHARGED ENGINE WITH VARIABLE RATIO DRIVE SUPERCHARGER

Cross-Reference To Related Application

This application is a continuation-in-part of U.S. Ser. No. 07/985,725, filed Dec. 4, 1992, and entitled "SUPERCHARGED ENGINE WITH VARIABLE RATIO DRIVE SUPERCHARGER".

TECHNICAL FIELD OF THE INVENTION

Our invention relates to supercharger systems for internal combustion engines in a vehicle driveline including a valve system for effecting a controlled airflow for fuel combustion purposes and for oxidizing engine exhaust gases.

BACKGROUND OF THE INVENTION

It is well known in the automobile industry that improved fuel economy for a vehicle driveline can be achieved by using relatively small displacement internal combustion engines. The performance of undersize displacement engine, however, may be unacceptable for high torque demand driving conditions for the vehicle driveline. It is common practice to improve the performance by providing additional combustion air to the engine intake manifold. This approach will make it possible to enjoy the improved fuel economy associated with smaller displacement engines during low torque demand conditions while providing a reserve torque capability under high performance driving conditions. The additional combustion air supply is provided by an air pump driven by the engine.

It also is common practice with automotive vehicle engines to provide a catalytic converter in the engine exhaust system for the purpose of oxidizing unburned hydrocarbons and oxides of nitrogen to reduce the percentage of undesirable exhaust emissions in the engine exhaust gases. As in the case of the intake manifold boost pressure pump, the air supply for the catalytic converter is developed by an engine-driven air pump.

There are two designs for intake air pressure boost systems known in the prior art that use an air pump for supplying air to the engine intake manifold. A first design employs a positive torque transfer drive from the engine crankshaft to the air pump torque input shaft. A second design uses engine exhaust gas flow to drive a turbine that in turn is mechanically coupled to the torque input shaft of the air pump. The first design is referred to as a supercharged engine system, and the second is referred to as a turbocharged engine system.

The turbocharged engine system, which is used in contemporary automotive vehicle-drivelines more often than the supercharged system, provides an increased volume of intake air for the engine intake manifold. The increased volume of air is mixed with additional fuel, thereby permitting an undersize engine to develop boosted torque output beyond the torque output that would be available with a naturally aspirated carburetor system or with a conventional fuel injection system. Such turbocharged engines thus will exhibit improved fuel economy when the torque requirements are low or moderate and improved engine performance when higher torque is demanded by raising the intake manifold air induction pressure by turbocharging. The turbocharger pump is driven by the turbine torque developed by the exhaust gas flow.

Prior art vehicle engine systems employing a turbocharger in this fashion additionally may require a separate air pump for supplying air to the catalytic converter to reduce exhaust pollutants during engine idle and during vehicle deceleration modes. Such air pumps are referred to as thermactor pumps.

An engine system having a turbocharger air induction system and a thermactor air pump typically exhibits delayed power boost when the vehicle is accelerating from a low speed. It has low engine torque at low engine speeds, although the torque output at high engine speeds is greater than a non-supercharged engine of comparable size. The delayed boost and the low end torque deficiency for the engine are due to the low rate of exhaust gas flow at low engine rpm. Efficient torque output at high engine rpm is due to the increase in exhaust gas flow which results in a driving torque on the turbocharger drive turbine that increases exponentially with engine rpm increases.

In the case of supercharged engines, the engine speed-torque characteristic is more responsive at low engine rpm to driver torque demands. Such supercharged engines, however, exhibit lower fuel economy over the full engine speed range compared to turbocharged engine systems. In a supercharged engine system, the air pump drive is a positive drive rather than a turbine drive, the positive drive being established by gearing or by a belt and pulley coupled to the engine crankshaft. The size of the gears in a geared drive, or the pitch diameter of the pulleys in the case of a belt drive, determines the drive ratio, which is a fixed ratio over all of the engine rpm range. The air pump for the supercharger system then would be driven at a speed that is directly proportional to the engine speed. As in the case of the turbocharged engine system described above, the supercharged engine system usually requires a separate small air pump for the purpose of developing combustion air for the thermactor function.

We are aware of other engine systems having a supercharger and a thermactor wherein a single air pump is used for both supercharging and for developing air for the catalytic converter. Examples of such systems using a single air pump for dual purposes is described in U.S. Pat. No. 4,488,400. The system described in the '400 patent includes a single air pump, but the pump is provided with two pumping chambers. Under certain driving conditions, the outlet side of each of the pumping chambers is distributed to the engine intake manifold. Under other driving conditions, a valve system for controlling the pump responds to signals from sensors that detect engine driving condition variables to deliver air to the catalytic converter. Under still other conditions, the valve system associated with the air pump will direct output air to both the catalytic converter and the engine intake. The speed of the air pump, as in the case of the prior art system described above, is directly proportional to the engine crankshaft speed.

Since a supercharged engine, in contrast to the turbocharger engine system, will provide improved low-end torque and less boost delay, it is common practice for the automotive designer to establish the drive ratio for the air pump drive at a relatively high value. That relatively high ratio, however, causes more air to be delivered to the engine intake and may allow the engine to develop excess torque when the engine speed increases. Such excess high-end torque could result in damage to the engine and to the driveline. It also could result in reduced fuel economy over the entire engine operating range. To prevent overboosting of the engine and overstressing of the driveline, a design compromise must be made as the fixed air pump drive ratio is selected and the air pump capacity is selected in order to avoid excess boost at high engine rpm as an attempt is made to improve the fuel economy at low engine rpm. Thus, the compromise results in less than optimum torque characteristics at both low speeds and at high speeds. The overall fuel efficiency for such a compromised system also is less than optimum.

One design solution that is known in the prior art involves the use of an electromagnetic clutch in the air pump drive system so that the air pump can be disengaged from the engine crankshaft under normal driving conditions. The clutch then can be engaged only during high torque demand conditions. Thus, the air pump does not result in undesirable parasitic losses during normal unboosted driving conditions. The clutch durability and the cost of the clutch system, as well as noise, vibration and harshness problems with such a combustion air boost system, are inappropriate for many vehicle applications. This design approach is described, for example, in prior art U.S. Pat. No. 4,350,135.

Still another design approach known in the prior art involves the use of a bypass valve activated in response to engine vacuum pressure changes. Under normal driving conditions, the bypass valve, which is connected between the inlet port and the outlet port of the air pump, is open so that minimal air pressure is developed by the pump when the pump is rotated. When the pump does not produce pressure, it takes less energy from the engine. The parasitic horsepower loss thus is reduced. This reduction in parasitic loss, of course, improves fuel economy. Under high torque demand conditions, the bypass valve can be closed, thereby permitting the air pump to produce sufficient air volume and pressure to boost the engine intake manifold pressure. The closing of the bypass valve is in response to a reduction in engine vacuum pressure caused by opening the engine throttle as the operator demands higher torque. In many engine applications, however, this design approach is inappropriate because of the durability problems with the air pump resulting from the continuous operation of the air pump at high speeds, even when the pump is not being used to pump air.

Yet another known design approach involves the use of an electric drive for the air pump in a boosted engine system. The air pump then can be driven entirely independently of engine speed. It can be designed, therefore, to be driven at a speed that is desirable for optimum engine boost throughout the entire engine speed range. It has been found, however, that electric drives of this kind are inefficient due to inefficiency in transferring mechanical energy to electrical energy with an alternator. Electrical energy transformation to stored chemical energy with a battery also is a source of inefficiency. The stored chemical energy further must be transferred to electrical energy in the battery; and finally, the electrical energy developed by the battery must be transformed to mechanical energy with a motor. The overall efficiency in a drive of this kind is typically less than 50 percent for most vehicle applications. Furthermore, the alternator size and battery capacity must be increased to accommodate an electric drive, thereby further adding to size, weight and cost to the powertrain.

The inefficiency of an electric drive, in the final analysis, results in a reduced engine fuel economy compared to a pure mechanical drive for the air pump in an engine of comparable size. Although an electric drive for the air pump may result in better performance at the low engine speed range, it will result in reduced engine fuel economy compared to a mechanical supercharger drive throughout the engine speed range.

BRIEF DESCRIPTION OF THE INVENTION

The improvements of the present invention comprise an electronically controlled variable ratio drive mechanism for an air pump in a supercharged engine system that employs a single air pump with a single chamber for the dual purpose of supercharging the engine and for supplying combustion air to a thermactor.

The variable ratio drive mechanism for the air pump is under the control of an electronic processor. The processor responds to input signals from sensors in the vehicle driveline that detect variables such as vehicle speed, engine rpm, throttle position, engine temperature, engine intake air temperature and transmission gear position. With these inputs, the electronic processor provides control signal outputs to the variable ratio drive mechanism and to an air direction valve that controls distribution of the air pressure developed by the single, dual-function air pump to the engine intake manifold or to the thermactor.

PARTICULAR DESCRIPTION OF THE INVENTION

Figure 1:
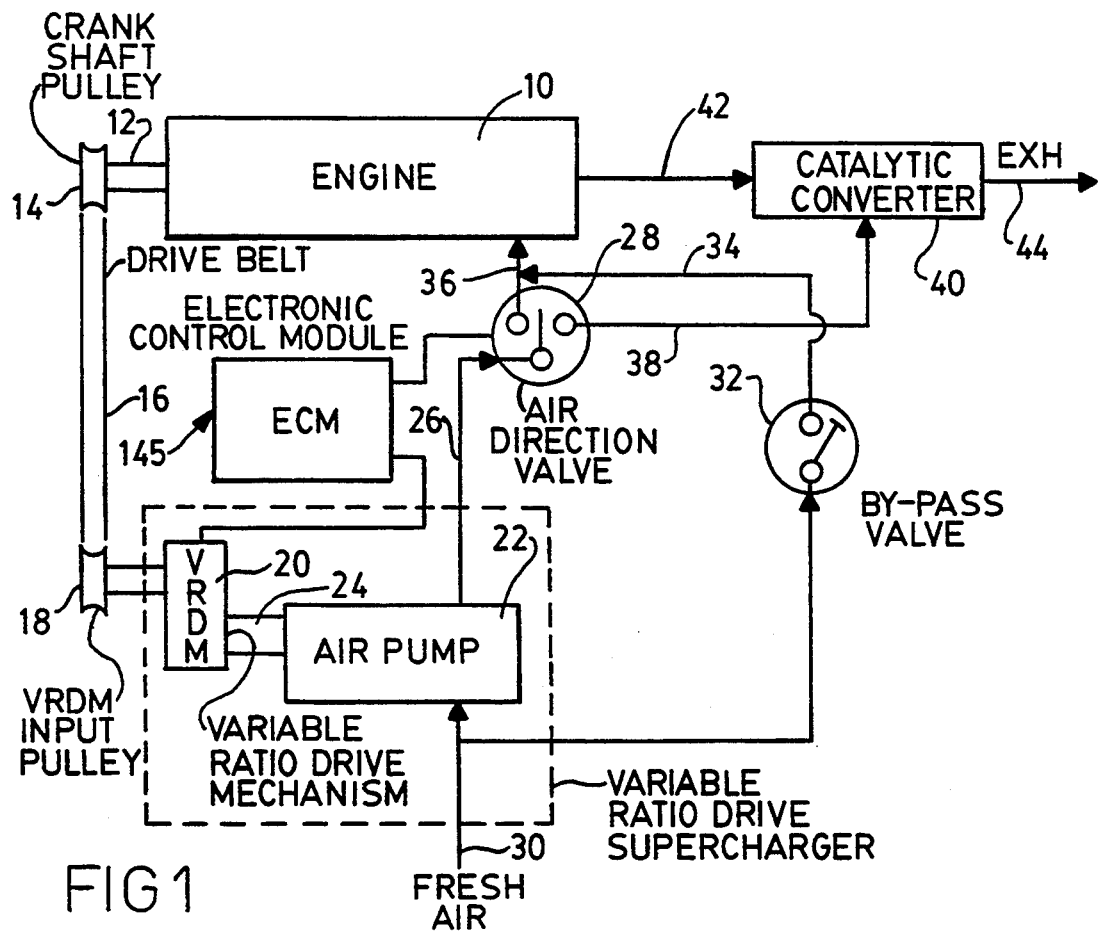
FIG. 1 shows a schematic block diagram of a supercharged engine system including a variable ratio drive supercharger and an air pump, an air direction valve, an electronic control module, an engine air bypass valve and a catalytic converter.

In FIG. 1, the engine is schematically illustrated in block diagram form at 10. The engine crankshaft 12 drives crankshaft pulley 14, which is connected by belt 16 to the input drive pulley 18 of a variable ratio drive mechanism 20. An air pump, illustrated in block diagram form at 22, is driven by the drive mechanism 20, the drive shaft being shown at 24.

Air pressure developed by the air pump 22 is delivered through passage 26 to air direction valve 28. Air is supplied to the air pump through ambient air intake passage 30.

When the air pump is not required for engine operation, passage 30 is connected through bypass valve 32 to engine intake airflow passages 34 and 36, thus bypassing the pump and the air direction valve 28.

Air pressure from the passage 26 can be directed by the air direction valve 28 either to the engine intake manifold through air intake passage 36 or to catalytic converter air supply passage 38.

The catalytic converter in FIG. 1 is illustrated in block diagram form at 40. It receives exhaust gas through exhaust gas passage 42 and delivers it to the exhaust system illustrated at 44.

Figure 2A:
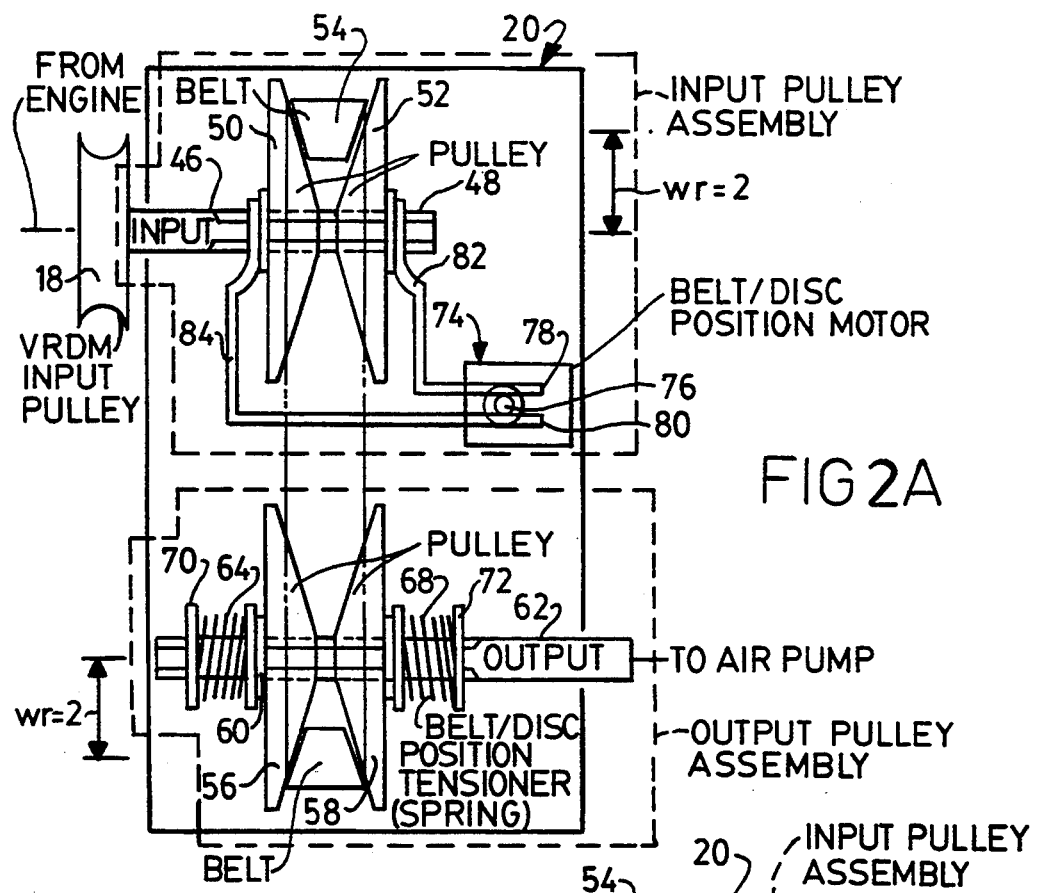
FIG. 2A is a schematic representation of the variable ratio drive mechanism of the invention shown in FIG. 1, which includes a drive pulley connected mechanically to the engine and a torque output pulley connected drivably to the air pump.
Figure 2B:
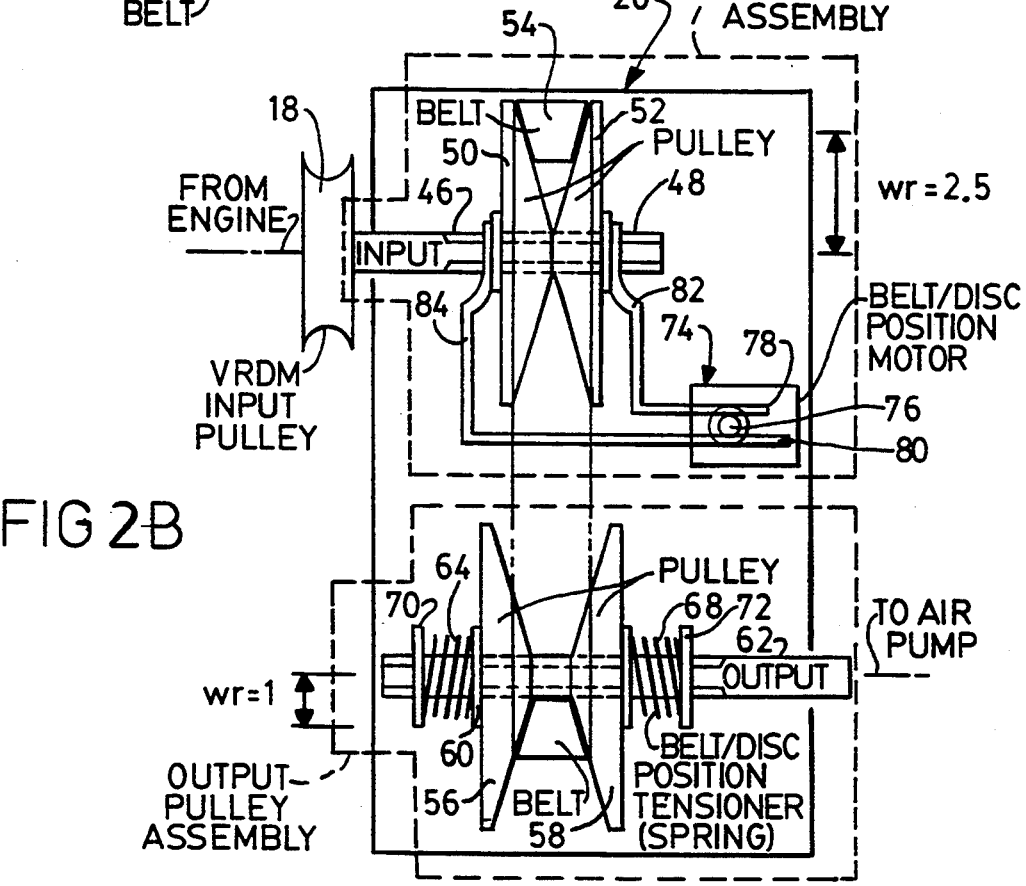
FIG. 2B is a view similar to the view of FIG. 2A, but it shows the drive ratio of the drive mechanism at an increased value of 1:2.5 in contrast to the drive ratio illustrated in the view of FIG. 2A.

The variable ratio drive 20 is shown schematically in FIGS. 2A and 2B. It includes a torque input shaft 46 connected directly to driven pulley 18. Shaft 46 is externally splined as shown at 48. Pulley discs 50 and 52 have hubs that are internally splined to receive the splines 48, thereby establishing a driving connection between the shaft 46 and the pulley discs as the pulley discs are adapted for axial adjustment on the shaft 46. Cone surfaces on the discs 50 and 52 drivably engage cone surfaces on a drive belt 54, the latter being trained around a driven pulley assembly comprising pulley discs 56 and 58. The geometry of the discs 50 and 52 may be identical to the geometry of discs 56 and 58. The cone surfaces of belt 54 frictionally engage corresponding cone surfaces on the discs 56 and 58.

As in the case of the torque input shaft, the torque output shaft is splined as shown at 60. Furthermore, discs 56 and 58 have hubs that are internally splined to provide a driving connection between the discs 56 and 58 and the output shaft which is identified by reference numeral 62.

A clamping force is applied to the discs 56 and 58 by compression springs 64 and 68 which are seated on reaction shoulders 70 and 72, respectively. Output shaft 62 is connected drivably to the air pump 22 shown in FIG. 1.

A double rack and pinion mechanism 74 comprises a drive pinion 76 and a pair of gear racks 78 and 80. An actuator arm 82 carried by the rack 78 applies an axial force to pulley disc 52 when the pinion 76 is rotated in a counterclockwise direction, as viewed in FIG. 2A. Similarly, rack 80 carries an actuator arm 84 which applies an axial force to the pulley disc 50 when the pinion 76 rotates in a counterclockwise direction.

If the pinion 76 is adjusted in a clockwise direction, the actuator arms 82 and 84 will allow separation of the pulley discs 50 and 52. This effectively decreases the pitch radius of the belt 54 with respect to the pulley discs 50 and 52. Thus, the overall torque multiplication ratio increases. Adjustment of the discs 56 and 58 occurs simultaneously with adjustment of the discs 50 and 52, such adjustment being allowed by the compression springs 64 and 68 which apply the proper belt loading force on the belt to prevent slippage.

In FIG. 2A, the variable ratio drive mechanism is shown in its one-to-one drive ratio configuration.

In FIG. 2B, the variable ratio drive mechanism is shown in its high ratio configuration. The ratio established by the pulley discs when they assume the configurations of FIG. 2B may be 1:2.5.

It is seen from FIGS. 2A and 2B that the effective working radius of the belt and pulley discs 50 and 52 decreases at the same rate as the effective working radius of the belt and discs 56, 58 increases. Adjustment of the spacing between the discs 50 and 52 resulting from rotation of the stepper motor that drives the pinion 76 will increase or decrease the working radii, depending upon the direction of rotation of the stepper motor.

Figure 4:
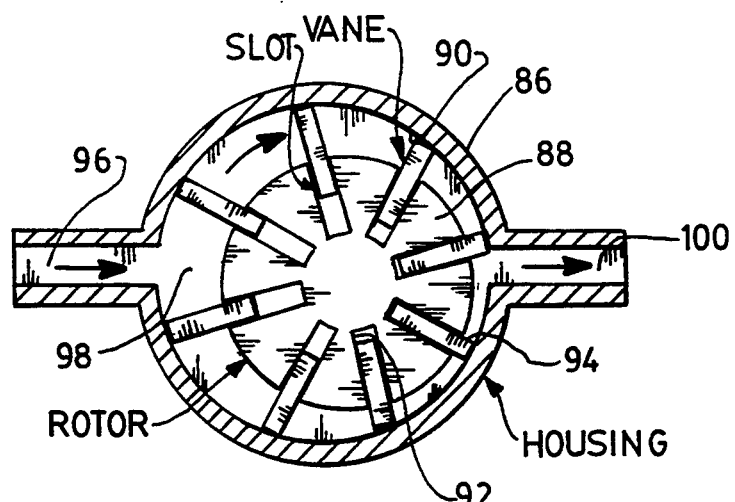
FIG. 4 is a schematic representation of an air pump that may be used in the system illustrated schematically in FIG. 1.

In FIG. 4, we have shown in schematic form a typical air pump that may be used in the supercharged engine system of FIG. 1. The pump includes a case or housing 86 which encloses a rotor 88. The housing 86 has a circular chamber 90 with an axis that is offset with respect to the axis of the rotor 88. The rotor 88 contains radial slots 92. Each slot contains a gas pumping vane 94. The radially outward extremities of the vanes 94 slidably engage the wall 90 of the housing 86.

A gas inlet port 96 receives ambient air. The air is distributed to pumping chamber 98 between two adjacent vanes. As the rotor 88 rotates, the pumping chamber volume progressively decreases. When the adjacent vanes reach outlet port 100, the air is compressed, and the compressed air is distributed through the outlet port 100 which communicates with passage 26 for the air direction valve 28 shown in FIG. 1.

Figure 6:
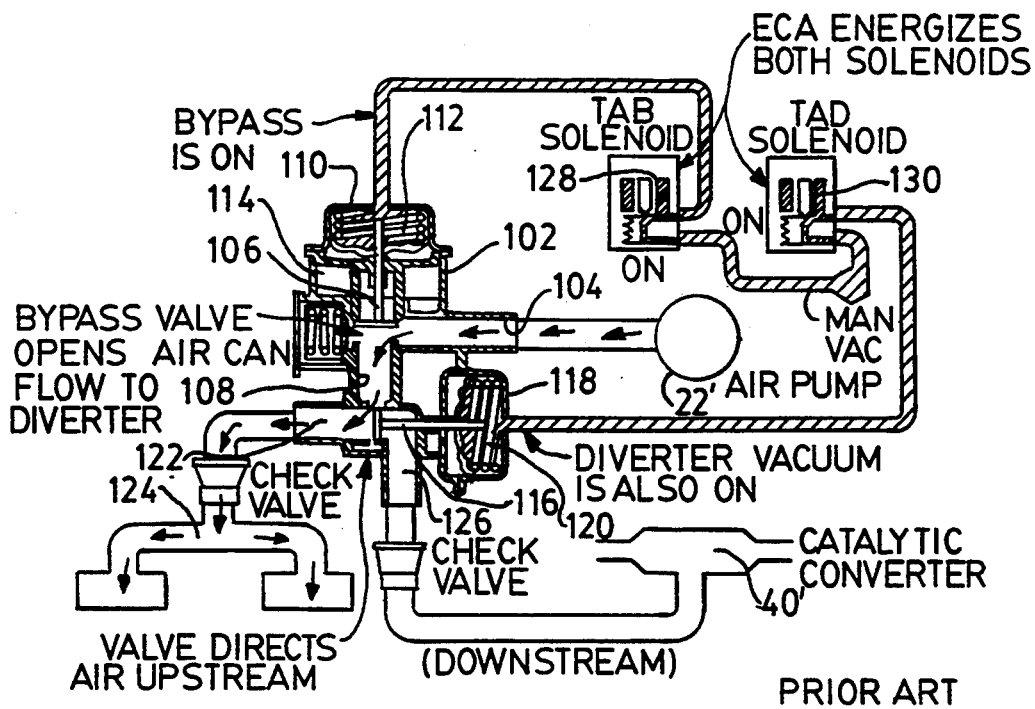
FIG. 6 is a schematic representation of a thermactor system having a vacuum control valve capable of controlling distribution of air from the air pump to the engine intake manifold upstream of the catalytic converter.
Figure 6A:
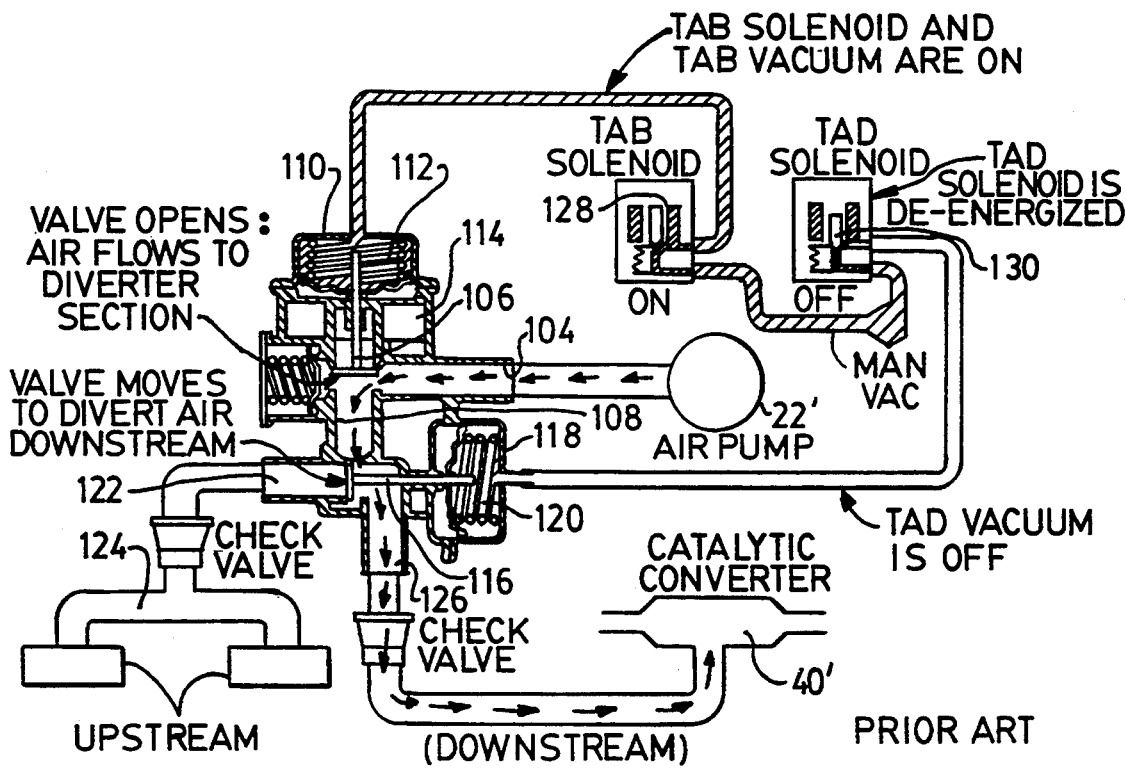
FIG. 6A is a view similar to FIG. 6, although the valve for controlling the air delivered by the air pump is adjusted so that all of the air delivered by the air pump is distributed to the catalytic converter, in contrast to the valve position shown in FIG. 6 where all of the air discharged by the air pump is delivered to the engine intake manifold.
Figure 6B:
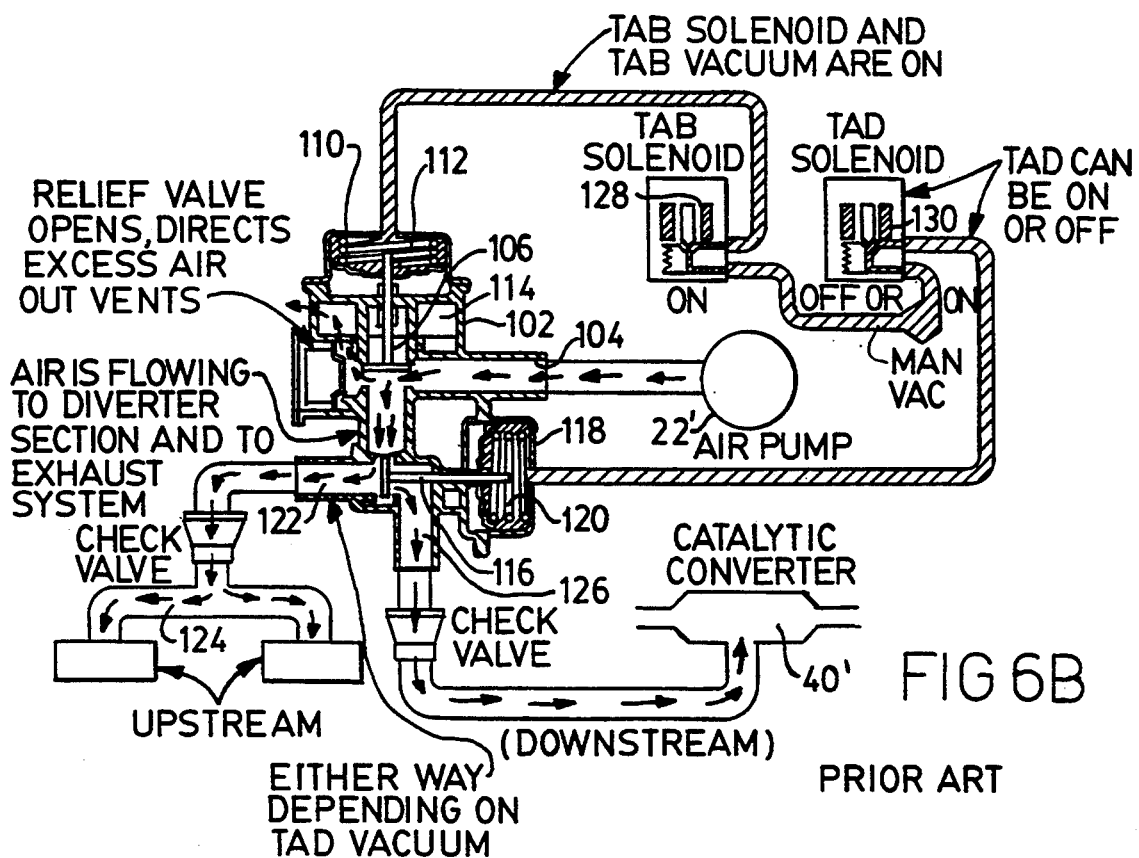
FIG. 6B is a view similar to FIG. 6, although the valve is positioned in FIG. 6B so that air is delivered to both the engine intake manifold and to the catalytic converter.

We have shown in FIGS. 6, 6A and 6B a prior art thermactor system that uses an air pump of the kind illustrated in FIG. 4 and an air control valve that functions in a manner that has similarities to the function of the air direction valve 28 of FIG. 1. A valve structure of this kind may be used in the supercharged engine system of FIG. 1 for controlling airflow from the air pump to the intake manifold of the engine or to the catalytic converter.

The valve of FIG. 6 includes a valve housing 102 having an intake port 104 that communicates with the discharge side of the air pump 22'. A poppet valve 106 controls communication between the port 104 and a first outlet port 108. Poppet valve 106 is actuated by a diaphragm actuator 110. A spring 112 urges the valve 106 to its seated position. When vacuum does not exist on the upper side of the diaphragm, the valve is closed and air from the air pump then passes directly to the exterior of the valve through vent ports 114. When vacuum exists, the valve is opened to the position shown in FIG. 6 and air from the air pump then passes from the intake port 104 into the outlet port 108 and then to the diverter valve 116, which is actuated by diaphragm 118.

Diverter valve spring 120 normally closes the diverter valve, thereby interrupting communication between port 108 and outlet port 122, the latter extending to engine intake manifold 124.

When the vacuum acting on the diaphragm 118 is insufficient to open the valve 116, communication is established between port 108 and outlet port 126 which communicates directly with the catalytic converter 40'.

When the valves 106 and 116 are positioned as shown in FIG. 6A, the engine operating mode calls for air to be delivered to the exhaust system including the catalytic converter 40'. This is the condition that exists during engine warm-up and the air/fuel mixture is rich. After the engine is warm and the vehicle is in motion, the diverter valve 116 will close because of a reduction in the vacuum acting on the diaphragm 118. If the vehicle is being driven aggressively, airflow to the engine intake manifold then is delivered by the air pump directly to the engine intake manifold through ports 108 and 122, as shown in FIG. 6. Very aggressive, aggressive and conservative driving modes will be discussed subsequently. The air pump and the air direction valve are bypassed as the air bypass valve opens during the cruise condition if the vehicle is being driven conservatively. This operation of the air bypass valve also will be discussed subsequently.

As the engine begins to warm up, it is possible that the temperature and the demand for engine torque will call for a partial opening of valve 116 as shown in FIG. 6B. There then would be simultaneous delivery of air to the engine intake manifold and to the catalytic converter. This is the operating state illustrated in FIG. 6B. During steady state operation after engine warm-up, the catalytic air and supercharged air are not needed, so airflow from the air pump will be bypassed.

Delivery of a vacuum to the diaphragm actuators for the valve 106 and the valve 116 is controlled by solenoid valves 128 and 130, respectively. In FIG. 6, the valves 128 and 130 are both open. They are partially open in the FIG. 6B operating mode. In the case of FIG. 6A, valve 128 is open, but valve 130 is closed. Thus, vacuum is delivered only to the actuator for valve 106. This causes a loss of vacuum for the actuator for the valve 116. Thus, the valve 116 is closed, as shown in FIG. 6A.

Solenoid valves 128 and 130 comprise movable valve elements that open and close valve ports in the vacuum lines, leading to the vacuum diaphragm actuator. The movable valve elements are controlled in known fashion by electromagnetic forces as the windings for the solenoid actuator are energized and de-energized.

Figure 5:
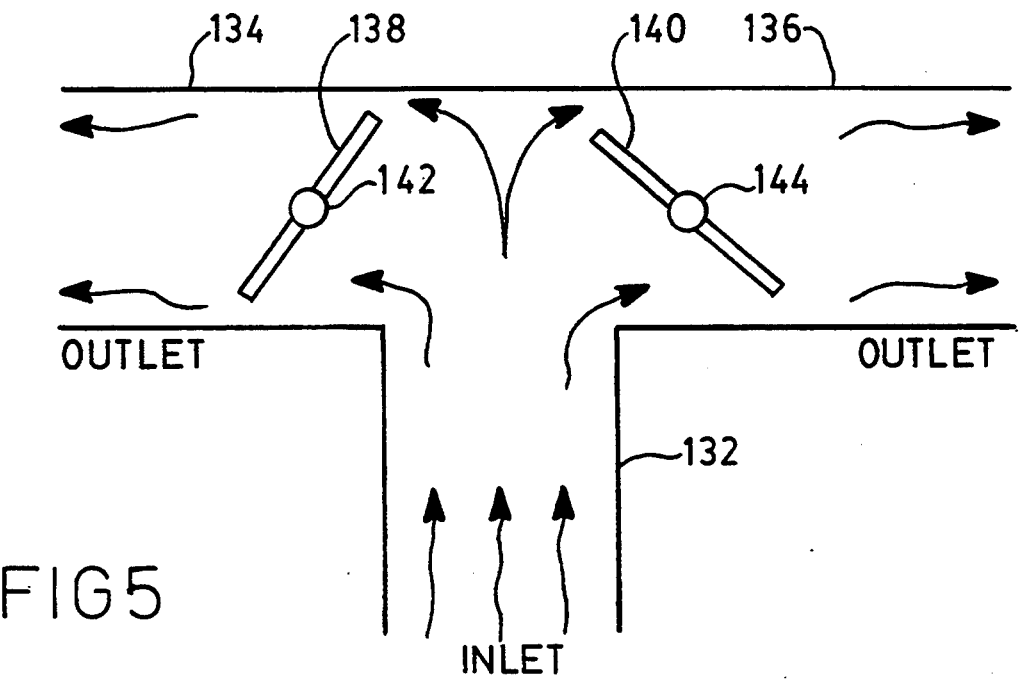
FIG. 5 is a schematic representation of an air direction valve for use in the supercharger engine system illustrated schematically in FIG. 1, wherein the air supply to the catalytic converter and the air supply to the engine are in a modulated mode.
Figure 5A:
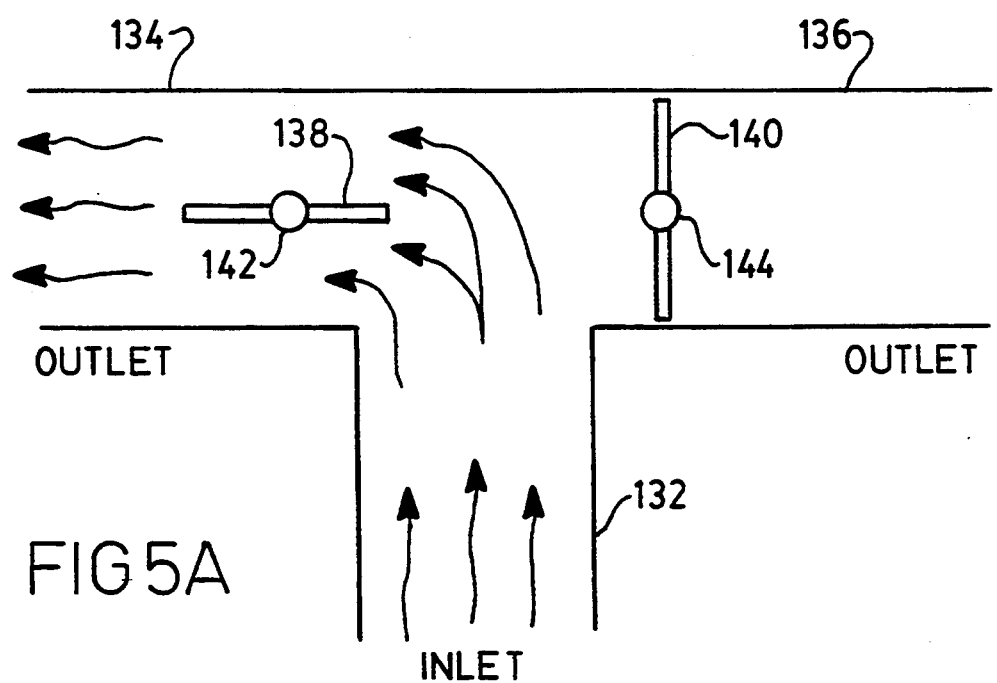
FIG. 5A is a view similar to FIG. 5, although the valves for supplying the ports leading to the engine and to the catalytic converter are closed and opened, respectively.
Figure 5B:
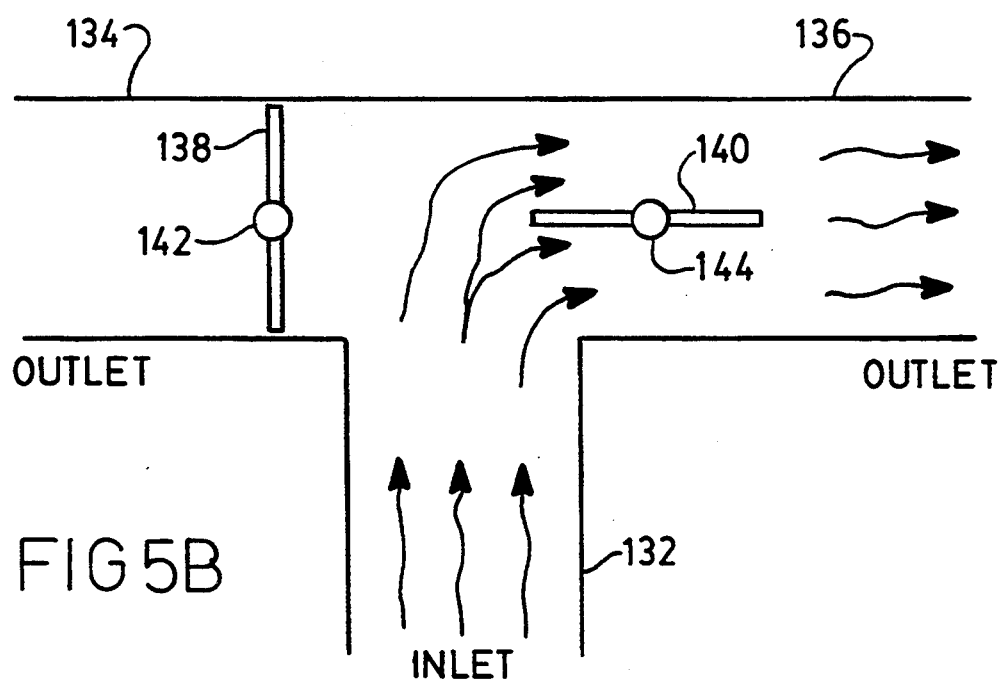
FIG. 5B is a view similar to FIG. 5, although the valves for the ports leading to the engine and to the catalytic converter are opened and closed, respectively.

Although we have shown poppet-type valves (106 and 116) in FIGS. 6, 6A and 6B that could be used as the equivalent of an air direction valve 28 in the FIG. 1 system, a preferred embodiment of the invention would include a butterfly valve arrangement for the air direction valve, as shown in FIGS. 5, 5A and 5B. In FIG. 5B, we have shown in schematic form an air direction valve having an inlet port 132. This communicates with outlet port 134, which communicates with the engine intake manifold and with outlet port 136, the latter communicating with the catalytic converter. Communication between the inlet port 132 and port 134 is controlled by a first butterfly valve 138. Similarly, communication between inlet port 132 and outlet port 136 is controlled by a second butterfly valve 140. Valves 138 and 140 are carried by throttle blade shafts 142 and 144, respectively. The angular position of the shafts 142 and 144 can be controlled by any suitable actuator, including a vacuum-type actuator of the kind illustrated in the valve assembly of FIGS. 6, 6A and 6B.

In FIG. 5, air from the air pump is delivered to the inlet port 132. Each of the butterfly valves 138 and 140 is partially opened, thereby establishing a modulated pressure in each outlet port 134 and 136. The direction of arrows for the air indicates the airflow path. The outlet ports 134 and 136 are connected to the air passages 36 and 38 of FIG. 1, respectively.

In FIG. 5A, we have shown the air direction valve in a configuration that permits air delivery from the pump directly to the Outlet port 134, whereas airflow to the outlet port 136 is interrupted. Butterfly valve 140 is in a closed or blocking position, and butterfly valve 138 is in a fully opened position with its plane generally parallel to the flow direction. In FIG. 5B, valve 140 is fully opened, and valve 138 is fully closed. Thus, airflow to the outlet port 134 is interrupted and all the air delivered by the pump is delivered to the port 136.

The variable ratio drive mechanism is controlled electronically with a microprocessor having an electronic control module 145 seen in FIG. 1, which also controls the air direction valve by means of solenoid actuators of the kind described with reference to FIGS. 6, 6A an 6B. On the other hand, the air bypass valve 32 may be controlled by engine vacuum.

Figure 3:
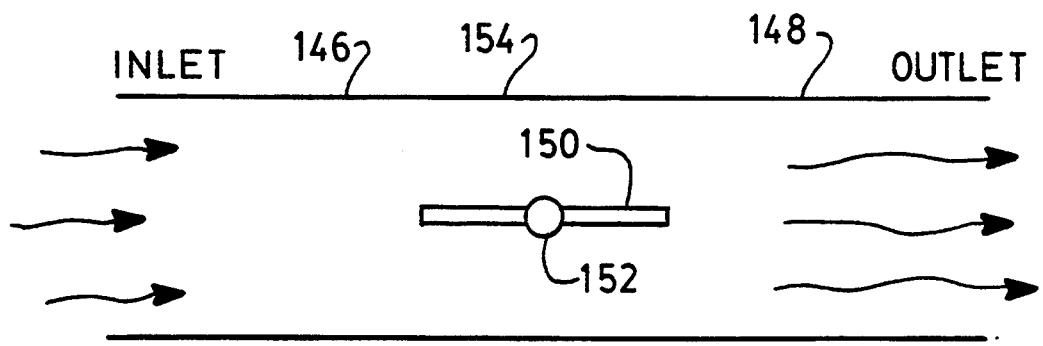
FIG. 3 is a schematic representation of the air bypass valve seen in the schematic view of FIG. 1 wherein the bypass valve is fully opened.
Figure 3A:
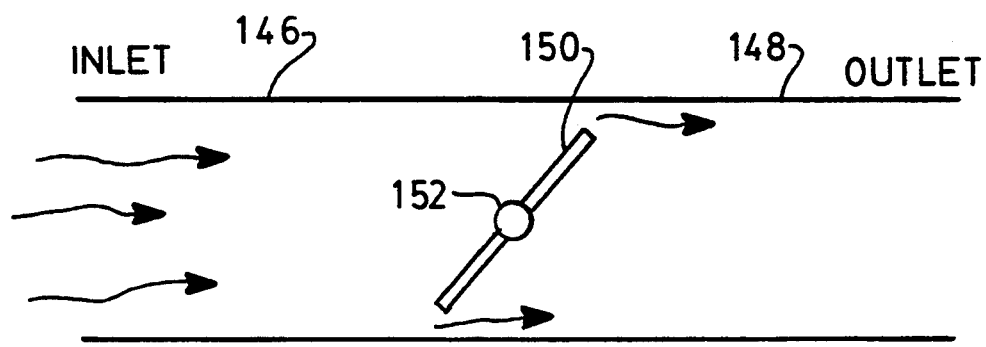
FIG. 3A is a view similar to FIG. 3, although the bypass valve is shown in an intermediate or modulating position.
Figure 3B:
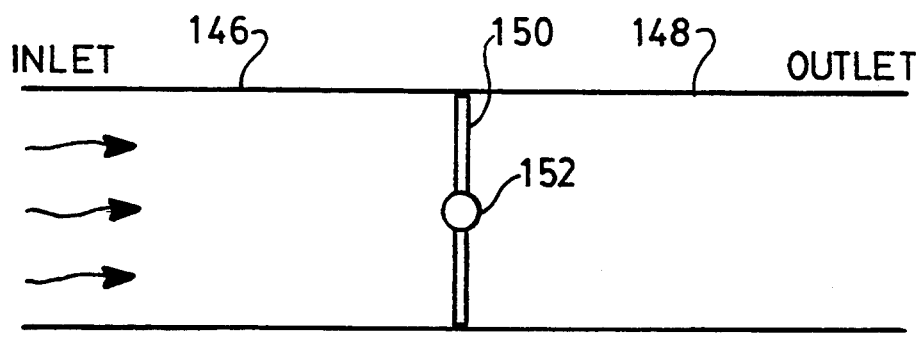
FIG. 3B is a view similar to FIG. 3, although the bypass valve is shown in the fully closed position.

Shown in FIGS. 3, 3A and 3B is a schematic representation of the air bypass valve 32 seen in FIG. 1. It comprises a simple inlet port 146 and a simple outlet port 148 which are in direct communication. The inlet port 146 is connected to passage 30 of FIG. 1 and outlet port 148 is connected to passage 34. Located between the inlet port and the outlet port is a simple butterfly valve 150 carried by valve shaft 152. The valve 150 rotates within valve housing 154 in which the ports 146 and 148 are located.

When the vacuum operator for the valve 150 adjusts the valve 150 to the position shown in FIG. 3, flow occurs between the inlet port 146 and the outlet port 148 with no restriction. When the valve 150 assumes the position shown in FIG. 3A, flow occurring between ports 146 and 148 is partially restricted so that the pressure in port 148 is modulated. When the valve 150 assumes the position shown in FIG. 3B, communication between the inlet port and the outlet port is interrupted.

The angular positions of the valves 140, 142 and 150 are variable and are under the control of the electronic processor 145. Although specific positions for the valves are illustrated in FIGS. 3, 3A, 3B, 5, 5A and 5B, the position of each can be varied under the control of the processor to any position between the extreme positions illustrated in the drawings.

The electronic control module 145 provides varying control signals to the variable ratio drive mechanism, thereby adjusting the angular position of the pinion 76. This is accomplished by means of a stepper motor which has an armature that can rotate in either direction. The electronic control module processes the input signals received from the sensors that detect vehicle speed, engine rpm, throttle position, engine temperature, engine intake air temperature, and transmission gear position. The ROM portion of the memory of the electronic control module is programmed to recognize which of the input signals would correspond to conservative driving, aggressive driving and very aggressive driving modes.

The electronic control module 145 processes the input signals and determines whether the vehicle is being driven conservatively, aggressively or very aggressively. The key input signals for this purpose are engine rpm, engine vacuum and throttle position, the latter being determined by a throttle position sensor directly coupled to the vehicle accelerator peddle. For example, the electronic control module recognizes conservative driving when the engine vacuum level is greater than a negative 1 psi and the rate of change of the throttle position is low (e.g., a change in engine throttle setting of 30 percent within 0.5 seconds). It also recognizes aggressive driving when the engine vacuum level is low (e.g., a value near zero psi) and the incremental engine throttle opening in about 0.5 seconds is between about 35 percent and 80 percent of the maximum opening. Very aggressive driving is recognized when the engine vacuum is near zero psi and the incremental engine throttle opening in about 0.5 seconds is above about 80 percent of the maximum opening.

When the engine is first started and is idling at 750 rpm, for example, the engine is cool and requires more thermactic function. At this time, the variable ratio drive mechanism is adjusted to a one-to-one ratio, and the positive displacement air pump rotates at 750 rpm. The electronic control module under these conditions will develop a signal for the air direction valve so that all of the air pumped by the air pump 22 will be delivered to the catalytic converter during idling, and no air will be delivered to the air intake manifold. This calls for the bypass valve to open, as shown in FIG. 3, so that the air pump and the air direction valve are bypassed and fresh air can be delivered directly to the engine intake manifold from the engine ambient air inlet as the air pump continues to pump air through the air direction valve to the catalytic converter. Passage 26 becomes connected to passage 38 through the air direction valve. This setting of the air direction valve is shown in FIG. 5B. Thus, the air pump functions as a thermactor pump, and the engine is operating in a non-supercharged mode or as a naturally aspirated engine.

When the vehicle is being driven conservatively, as determined by the electronic control module, the supercharged engine system will function as a non-supercharged engine and the air pump will function as a thermactor with the bypass valve open, as in the case of the engine mode corresponding to initial engine start-up with the engine idling. When the driver increases the engine rpm slowly to about 3300 rpm, and if the electronic control module continues to monitor conservative driving, the signals that are delivered to the variable ratio drive mechanism will cause the variable ratio drive mechanism to assume a ratio of 2.5:1. Thus the air pump will operate at only 1200 rpm as the engine runs at 3000 rpm. The air pump under these conditions requires much less energy to operate, yet sufficient air is delivered to the catalytic converter to supply the needs of the catalytic converter without having excessive parasitic loss due to excessive air pumping. Furthermore, the reduced air pump speed under these conditions improves the air pump durability.

The advantages of the lower air pump speed beyond the maximum torque speed can be realized also when the engine speed increases. Even with an increased engine speed during a conservative driving mode, the requirements of the catalytic converter are reduced. Thus, there is no need for high air pump speeds under these driving conditions. In contrast, a conventional drive system having a fixed ratio between the engine crankshaft and the air pump does not have this operating flexibility.

If the electronic control module, as it monitors the signals received from the engine sensors, detects that the driver is driving aggressively, the electronic control module provides a control signal to the variable ratio drive mechanism causing a ratio adjustment to the one-to-one drive ratio. Another control signal will be delivered to the air direction valve 28 such that all the airflow from the air pump will go to the engine air intake. No air will be delivered, then, to the catalytic converter. Passage 26 becomes connected to passage 36 and communication between passages 26 and 38 will be interrupted. This condition is illustrated in the schematic diagram of FIG. 5A. At this time, aggressive driving will cause a decrease in the engine vacuum, causing bypass valve 32 to close. Thus, the engine intake manifold pressure will be boosted by reason of the positive airflow produced by the air pump, and the engine supercharger system will function as a conventional supercharged engine to achieve performance improvement.

When the electronic control module detects a "very" aggressive driving mode, as distinct from an aggressive driving mode, the electronic control module will provide a control signal to the variable ratio drive mechanism to cause a ratio adjustment to 1:2.5, a control signal will be delivered to the air direction valve so that all of the air from the air pump will continue to go to the engine air intake, as in the case of the aggressive driving mode. The bypass valve will continue to be closed because of the decreased vacuum. Because of the adjustment of the variable ratio drive mechanism, the air pump rotates at speeds 2.5 times faster than the engine speed. The engine will be boosted to a much higher torque level than in the case of a conventional supercharged engine because conventional supercharged engines do not have a drive with the ratio range of our improved system. The increased boost that thus is available with our improved system is translated into much improved performance.

More fuel is consumed during an aggressive driving mode and during a very aggressive driving mode, but the duration of such operating conditions is shorter compared to the time the vehicle is in the conservative driving mode. In general, 90 percent of the driving time will be in the mode that does not require engine supercharging. Six percent of the driving time will require moderate supercharging where the variable ratio drive mechanism is adjusted to ratios of 1:1 to 1:1.5. Four percent of the driving will require much more supercharging with the variable ratio drive mechanism adjusted to a ratio of 1:1.6 to 1:2.5. Although the supercharged engine system consumes more fuel while providing higher engine performance, 90 percent of the driving time will enjoy a substantial fuel economy with an undersized engine.

It is possible for our improved supercharged engine system to provide almost a constant level of torque from 1000 rpm to the top of the usable engine speed range. This is possible because the electronic control module can be programmed to vary the drive ratio of the variable ratio drive mechanism to cause the air pump to generate an appropriate boost pressure throughout the usable engine speed range. The constant engine torque generated by the engine system of this invention can provide improved vehicle performance without overstressing either the engine or the powertrain; i.e., the transmission, either manual or automatic, the axle and differential, and the driveshaft.

Figure 7:
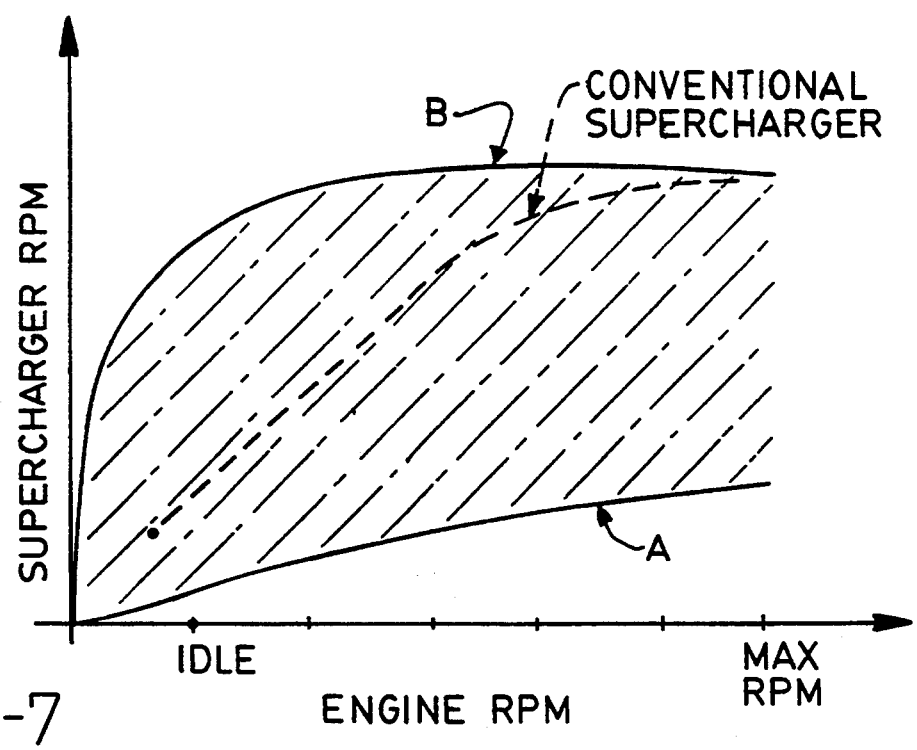
FIG. 7 is a graph showing the relationship between supercharger speed and engine speed for the improvements of our invention.

FIG. 7 shows the relationship between supercharger speed and engine rpm for our improved system. Curve "A" in FIG. 7 shows the supercharger speed/engine speed relationship for the lowest speed ratio of the variable ratio drive, and curve "B" shows the corresponding relationship when the variable ratio drive is in its highest ratio setting. The dotted line curve of FIG. 7 is the speed relationship for a system that includes a conventional speed sensitive variable drive for a supercharged engine as shown, for example, in Goto U.S. Pat. No. 5,022,375. It is possible, as seen in FIG. 7, to achieve an early rise in supercharger speed as the engine speed varies from idle to maximum RPM.

Figure 8:
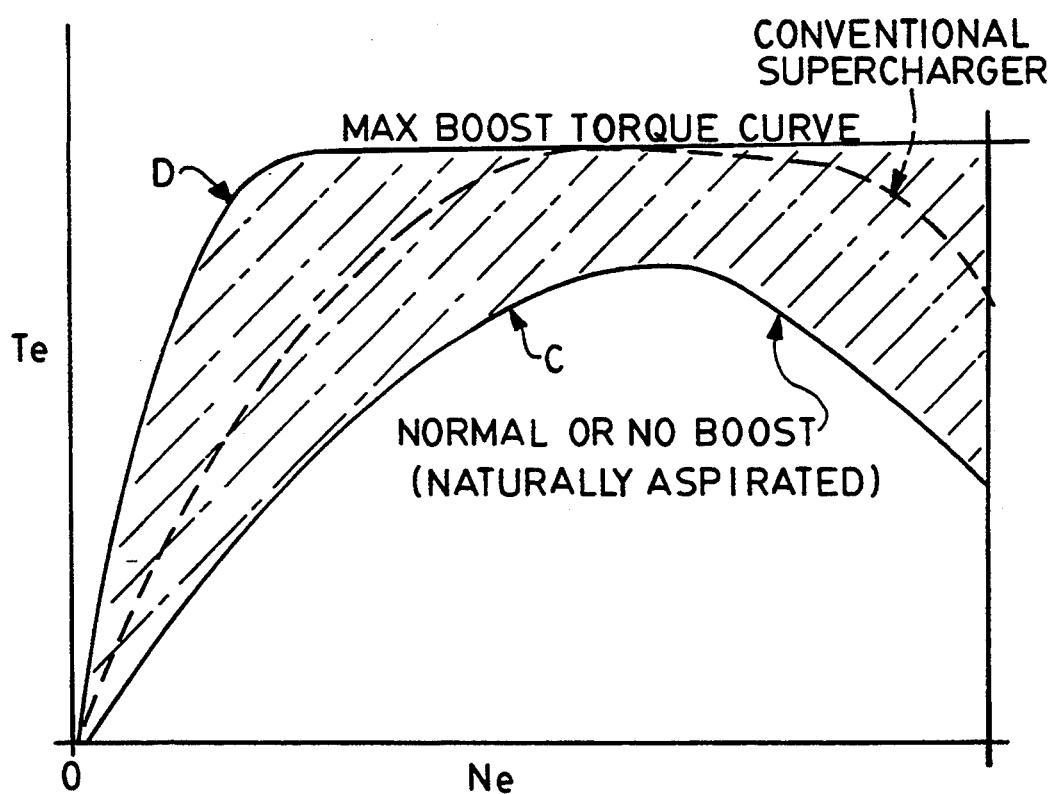
FIG. 8 is a performance graph showing the improvement in torque that can be realized by incorporating the improvements of our invention in a vehicle driveline.

The performance curve that is obtained using our improved system is shown in FIG. 8. The shaded area of FIG. 8 represents the improved performance zone in the engine torque/engine speed relationship that will be obtained. Curve C in FIG. 8 shows the engine speed-/engine torque relationship for a non-supercharged engine, and curve D shows the improved torque that can be expected for any given engine speed using-our improved system.

As can be seen in FIG. 8, the low speed improvement in performance for the engine is greatly enhanced using our improved system. Further, the high speed improvement in performance does not fall off as the mid-speed range is exceeded. The corresponding performance that might be expected using a conventional system, such as the system of U.S. Pat. No. 5,022,375, is shown by the dashed curve of FIG. 8. The dashed curve, as is apparent in FIG. 8, peaks at the mid-speed range, rises more slowly at low engine speeds and falls off at high engine speeds.

The variable pulley mechanism described in the '375 patent provides a fixed relationship (fixed curve) between supercharger rpm and engine rpm. Thus, only one supercharger rpm is provided for a given engine rpm. This relationship cannot be changed during normal vehicle operation in response to functions other than engine rpm. That is, supercharger rpm cannot be changed as a function of vehicle speed, throttle position, engine temperature, engine intake temperature, and transmission gear position parameters. The supercharger rpm cannot be changed based on vehicle operating parameters from the predetermined, single-function curve while driving.

Having described a preferred embodiment of our invention, what we claim and desire to secure by United States Letters Patent is:

1. An air supply system for an automotive vehicle driveline having a throttle-controlled internal combustion engine and a geared transmission, said engine having a catalytic converter, an air intake manifold and an exhaust gas flow manifold, said catalytic converter communicating with said exhaust gas flow manifold;

a common air pump for said intake manifold and said catalytic converter, an air pressure delivery passage, and an air direction valve means disposed in and partly defining said delivery passage for controlling air distribution from said pump to said intake manifold and to said catalytic converter;

an air bypass valve means for delivering air directly to said intake manifold in response to changes in pressure in said intake manifold, thus selectively bypassing said pump and said air direction valve;

a drive means having a variable torque ratio for delivering torque from said engine to said pump, and an electronic processor means for determining and varying said air pump speed;

said electronic processor means being responsive to vehicle operating variables including engine speed, engine throttle position, throttle position change rate, engine oil temperatures, engine intake air temperatures and transmission gear ratio range for changing the torque ratio of said drive means.

2. A supercharged engine system for an automotive vehicle comprising a variable speed internal combustion engine with an exhaust manifold, an air intake manifold and a catalytic converter connected to said exhaust manifold, said intake manifold being characterized by a variable manifold pressure;

a common air pump for said intake manifold and for said catalytic converter and an air direction valve means for delivering air selectively from said pump to said intake manifold and to said catalytic converter;

an air bypass valve means for delivering air directly to said intake manifold in response to a lowering of intake manifold vacuum, thus bypassing said pump and said air direction valve;

drive means having a variable torque ratio including means for varying the torque ratio thereof for delivering driving torque from said engine to said pump; and electronic processor means responsive to changes in engine speed and intake manifold pressure for developing command signals for said ratio varying means to vary the ratio of said drive means and for activating said air direction valve means to selectively distribute air from said pump to said intake manifold and to said catalytic converter.

3. The combination as set forth in claim 1 wherein said variable ratio drive means comprises a torque input pulley assembly and a torque output pulley assembly, said output pulley assembly being connected drivably to said air pump, said torque input pulley assembly being connected drivably to said engine, a belt drivably connecting said pulley assemblies, said input pulley assembly and said output pulley assembly each having adjustable sheave portions characterized by an effective pitch radius that varies upon adjustment of said sheave portions, one with respect to the other;

said electronic processor means being responsive to changes in engine operating conditions for developing command signals to variably adjust the effective pitch radius of said pulley assemblies whereby the torque ratio of said drive means changes, thus providing an extended range of ratios of pump speeds for a given engine speed.

4. The combination as set forth in claim 2 wherein said drive means comprises a torque input pulley assembly and a torque output pulley assembly, said output pulley assembly being connected drivably to said air pump, said torque input pulley assembly being connected drivably to said engine, a belt drivably connecting said pulley assemblies, said input pulley assembly and said output pulley assembly each having adjustable sheave portions characterized by an effective pitch radius that varies upon adjustment of said sheave portions, one with respect to the other;

means for variably adjusting said sheave portions to effect changes in said effective pitch radius of said pulley assemblies whereby the torque ratio of said variable ratio drive means changes, thus providing an extended range of ratios of engine speed to pump speed.

5. The combination as set forth in claim 3 wherein said air direction valve means has an inlet port connected to said air pump, a first output port connected to said intake manifold and a second outlet port connected to said catalytic converter;

said processor means responding to said operating variables to detect an aggressive operating mode and a conservative operating mode;

said air direction valve responding to said command signals from said electronic processor means to direct air from said pump to said first output port when an aggressive operation mode is detected and to said second output port when a conservative operation mode is detected.

6. The combination as set forth in claim 4 wherein said air direction valve means has an input port connected to said air pump, a first output port connected to said intake manifold and a second output port connected to said catalytic converter;

said processor means responding to said operation conditions to detect an aggressive operating mode and a conservative operating mode;

said air direction valve responding to command signals from said processor means to direct air from said pump to said first output port when an aggressive operation mode is detected and to said second output port when a conservative operation mode is detected.

7. The combination as set forth in claim 1 wherein said electronic processor means is adapted to respond to a decreasing throttle opening to increase said torque ratio of said variable drive means throughout a wide range of engine speeds as said air direction valve directs air from said pump to said catalytic converter, thereby allowing said pump to operate at lower speeds that increase pump durability and efficiency.

8. The combination as set forth in claim 2 wherein said processor means is adapted to respond to a decreasing throttle opening to increase the torque ratio of said variable drive means throughout a wide range of engine speeds as said air direction valve directs air from said pump to said catalytic converter, thereby allowing the pump to operate at speeds that increase pump durability and efficiency.

9. An air supply system for an automotive vehicle driveline having a throttle-controlled, variable-speed, internal combustion engine and a geared transmission, said engine having a catalytic converter, an air intake manifold and an exhaust gas flow manifold, said catalytic converter communicating with said exhaust gas flow manifold;

a common, variable-speed air pump for said intake manifold and said catalytic converter, an air pressure delivery passage, and an air direction valve means disposed in and partly defining said delivery passage for controlling air distribution from said pump to said intake manifold and to said catalytic converter;

an air bypass valve means for delivering air directly to said intake manifold in response to changes in pressure in said intake manifold, thus selectively bypassing said pump and said air direction valve;

a variable ratio drive means for delivering torque from said engine to said pump, and an electronic processor means for determining and varying the speed of said air pump;

said electronic processor means being responsive to vehicle operating variables including engine speed and engine throttle position for varying the ratio of said variable ratio drive means.

* * * * *